United States Patent
Liu et al.

(10) Patent No.: US 11,062,020 B2
(45) Date of Patent: Jul. 13, 2021

(54) PROCESSOR CHECKING METHOD, CHECKING DEVICE AND CHECKING SYSTEM

(71) Applicant: TSINGHUA UNIVERSITY, Beijing (CN)

(72) Inventors: Leibo Liu, Beijing (CN); Ao Luo, Beijing (CN); Shouyi Yin, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 332 days.

(21) Appl. No.: 16/250,126

(22) Filed: Jan. 17, 2019

(65) Prior Publication Data
US 2019/0251253 A1 Aug. 15, 2019

(30) Foreign Application Priority Data
Feb. 9, 2018 (CN) .......................... 201810139949.8

(51) Int. Cl.
*G06F 21/52* (2013.01)
*G06F 21/55* (2013.01)

(52) U.S. Cl.
CPC ............ *G06F 21/52* (2013.01); *G06F 21/554* (2013.01); *G06F 2221/034* (2013.01)

(58) Field of Classification Search
CPC .. G06F 21/52; G06F 21/554; G06F 2221/034; G06F 21/79; G06F 21/71; G06F 21/73
See application file for complete search history.

(56) References Cited

U.S. PATENT DOCUMENTS

| | | | | |
|---|---|---|---|---|
| 7,474,312 B1* | 1/2009 | Rohrer | ...................... | G06F 3/14 |
| | | | | 345/530 |
| 10,776,197 B1* | 9/2020 | Lv | ........................... | G06F 3/067 |
| 2006/0174056 A1* | 8/2006 | Lambert | ................. | G06F 21/79 |
| | | | | 711/103 |

(Continued)

FOREIGN PATENT DOCUMENTS

| CN | 101561775 A | 10/2009 |
|---|---|---|
| CN | 106502926 A | 3/2017 |

OTHER PUBLICATIONS

"First Office Action and English language translation", CN Application No. 201810139949.8, dated Nov. 9, 2020, 17 pp.

*Primary Examiner* — Meng Li
(74) *Attorney, Agent, or Firm* — Myers Bigel, P.A.

(57) ABSTRACT

The present disclosure provides a processor checking method, a checking device and a checking system. The method includes acquiring an access record to a memory by a processor during a running process, the access record includes a read operation information and a corresponding time information, determining whether there is a read operation information corresponding to a high access authority in the access record, and when there is a read operation information corresponding to a high access authority, determining whether the read operation information corresponding to the high access authority belongs to an unauthorized operation. According to embodiments of the present disclosure, the behavior of the processor reading data from the memory is checked and analyzed, thereby preventing the security problems caused by malicious use of unauthorized reading operation.

15 Claims, 3 Drawing Sheets

(56) References Cited

U.S. PATENT DOCUMENTS

| | | | |
|---|---|---|---|
| 2007/0021141 A1* | 1/2007 | Yokota | G06F 21/10 455/550.1 |
| 2015/0138676 A1* | 5/2015 | Kaddeche | G11B 5/4806 360/266.4 |
| 2018/0165246 A1* | 6/2018 | Han | G06F 11/0724 |

* cited by examiner

PROCESSOR CHECKING METHOD, CHECKING DEVICE AND CHECKING SYSTEM

CROSS-REFERENCE TO RELATED APPLICATION(S)

This application claims priority to a Chinese Patent Application No. 201810139949.8, filed with the Chinese Patent Office on Feb. 9, 2018 and entitled "Processor checking method, checking device and checking system", which is incorporated herein by reference entirely.

TECHNICAL FIELD

The present disclosure relates to a processor checking method, a checking device and a checking system.

BACKGROUND

Modern processors increase processing power by simultaneously performing different tasks at various stages of the pipeline. To make this pipeline mechanism more efficient, modern processors further introduce branch prediction mechanism and out-of-order execution mechanism to perform operations more efficiently. The branch prediction mechanism is mainly used to solve the problem of improving execution efficiency by predicting and executing the code of the target address before the jump branch is completely determined. If the prediction fails, the pipeline will discard the predicted code which is wrong, and the state of the processor is rolled back. The out-of-order execution mechanism improves parallel execution capability by scrambling the execution order of the code. These processor optimization techniques are helpful for the performance of modern processors. But recently security researchers have found that these features of modern processor architecture pose a security risk that could be exploited by attackers in specific situations. Therefore, it is urgent to design a hardware security checking scheme to improve the hardware security of the processor.

SUMMARY

In order to solve the above problems in the prior art, the embodiment of the present disclosure provides a processor checking method, a checking device and a checking system, checks and analyzes the behavior of the processor reading data from the memory, thereby preventing the security problems caused by malicious use of unauthorized reading operation.

One aspect of the present disclosure provides a processor checking method. The method includes: acquiring an access record of the processor to a memory by a processor during a running process, the access record includes a read operation information and a corresponding time information; determining whether there is a read operation information corresponding to a high access authority in the access record; and when there is a read operation information corresponding to a high access authority, determining whether the read operation information corresponding to the high access authority belongs to an unauthorized operation.

Alternatively, when determining that there is a read operation information corresponding to a high access authority in the access record, an information of an address space corresponding to the high access authority may be acquired; and whether there is a read operation information falling in the address space corresponding to the high access authority may be determined according to the address items of respective read operation information in the access record.

Alternatively, when determining that the read operation information corresponding to the high access authority belongs to an unauthorized operation, a time window may be set according to a time information of the read operation information corresponding to the high access authority; then whether the access authority of the processor is a high access authority within the time window may be determined.

Alternatively, when determining that the access authority of the processor is a high access authority within the time window, it may be determined whether there is a record of the high access authority in an access authority record of the processor within the time window.

Alternatively, the length of the time window is greater than a sum of a prefetch time difference and a time overhead of reading data from the memory.

Alternatively, when the processor is a multi-core processor, the access record further includes an identifier of a processor core to which read operation information belongs.

Alternatively, when it is determined that the read operation information corresponding to the high access authority belongs to an unauthorized operation, the information corresponding to the unauthorized operation may be saved, and a security alert may be sent to a user.

Another aspect of the present disclosure provides a processor checking device. The checking device includes: an acquiring unit configured to acquire an access record to a memory by the processor during a running process, the access record includes a read operation information and a corresponding time information; a first determining unit configured to determine whether there is a read operation information corresponding to a high access authority in the access record; and a second determining unit configured to: when there is a read operation information corresponding to a high access authority, determine that the read operation information corresponding to the high access authority belongs to an unauthorized operation.

Alternatively, the first determining unit is specifically configured to: acquire an information of an address space corresponding to the high access authority; and determine whether there is a read operation information falling in the address space corresponding to the high access authority according to the address items of respective read operation information in the access record.

Alternatively, the second determining unit is specifically configured to: set a time window according to a time information of the read operation information corresponding to the high access authority; and determine whether an access authority of the processor is a high access authority within the time window.

Alternatively, the second determining unit is specifically configured to: determine whether there is a record of the high access authority in an access authority record of the processor within the time window.

Alternatively, the length of the time window is greater than a sum of a prefetch time difference and a time overhead of reading data from the memory.

Alternatively, when the processor is a multi-core processor, the access record further includes an identifier of a processor core to which read operation information belongs.

Alternatively, the checking device further includes an alerting unit. The alerting unit is configured to save information corresponding to the unauthorized operation and send a security alert to a user.

Alternatively, the checking device further includes an input and output recording unit. The input and output recording unit is configured to record access operations of the processor to the memory during the running process, wherein the input and output recording unit is disposed between the processor and the memory; and the acquiring unit is specifically configured to read the access record from the input and output recording unit.

Another aspect of the present disclosure provides a processor checking system for checking a checked processor. The checking system comprises: one or more checking processors; and a memory, configured to store one or more programs, wherein the one or more programs, when executed by the one or more checking processors, cause the one or more checking processors to perform the method above-mentioned.

Another aspect of the present disclosure provides a computer-readable storage medium storing instructions capable of executing the method above-mentioned.

BRIEF DESCRIPTION OF THE DRAWINGS

For a more complete understanding of the present disclosure and its advantages, reference is now made to the following descriptions in connection with the accompanying drawings, in which.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure. In addition, the embodiments of the present disclosure provided below and the technical features in the embodiments may be combined with each other in any way.

The terminology used herein is for the purpose of describing particular embodiments only and is not intended to limit the present disclosure. Furthermore, the terms "include", "comprise", etc. as used herein indicate the presence of stated features, steps, operations, and/or components but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present description and should not be interpreted in an idealized or overly stereotypical manner.

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatus such that the instructions, when executed by the processor, may create means for implementing the functions/operations illustrated in these block diagrams and/or flow charts.

Accordingly, the techniques of the present disclosure may be implemented in the form of hardware and/or software (including firmware, microcode, etc.). Additionally, the techniques of the present disclosure may take the form of a computer program product on a computer readable medium having stored thereon instructions for use by or in connection with an instruction execution system. In the context of the present disclosure, a computer readable medium may be any medium that can contain, store, communicate, propagate, or transport the instructions. For example, computer readable medium may include but are not limited to electrical, magnetic, optical, electromagnetic, infrared, or semiconductor systems, apparatus, devices, or propagation medium. Specific examples of computer readable medium include a magnetic storage device such as a magnetic tape or a hard disk (HDD), an optical storage device such as a compact disc (CD-ROM), a memory such as a random access memory (RAM) or a flash memory, and/or wired/wireless communication link.

According to the newly disclosed "Meltdown" and "Spectre" attacks, the attacker repeatedly uses the CPU instruction to clear an address of the memory out of the CPU cache (the clear process is referred to as Flush). After a period of time, the memory data of the address is read and the read time is measured (the read and measurement is referred to as Reload). In this way, through this "Flush+Reload" method, the attacker may clearly know whether the address has been read by a target program during this period of time, and then push back some sensitive information. This is because once the target program reads the address, its corresponding memory will enter into the CPU cache, causing the attacker's access delay to the address to drop significantly. Under the branch prediction mechanism and the out-of-order execution mechanism, the confidential information in the processor may be stolen by the above attack method, which poses a great security threat to the processor.

For the above security problem, an embodiment of the present disclosure provides a processor checking method and device. The method includes: acquiring an access record to a memory by a processor during a running process, the access record includes a read operation information and a corresponding time information; determining whether there is a read operation information corresponding to a high access authority in the access record; and when there is a read operation information corresponding to a high access authority, determining whether the read operation information corresponding to the high access authority belongs to an unauthorized operation.

If the checking finds that there is a read operation information belonging to an unauthorized operation in the access record, a security warning message is sent to the user, so that the user takes corresponding control measures according to the needs of the user (such as cutting off data transfer or turning off the processor), thereby preventing the malicious use of potential security risks. Therefore, the embodiments of the present disclosure are capable of effectively preventing malicious use of the above security risks and cross-authority data leakage problems caused thereby without affecting the high-efficiency running performance of the processor, and greatly improving processor security.

It should be understood that the embodiments of the present disclosure are not limited to the application scenarios of the above-mentioned "Meltdown" and "Spectre" attacks. The two attack methods are only examples for facilitating understanding of the embodiments of the present disclosure. The protection scope of the embodiments of the disclosure should be based on the technical characteristics defined in the claims.

Figure 1:
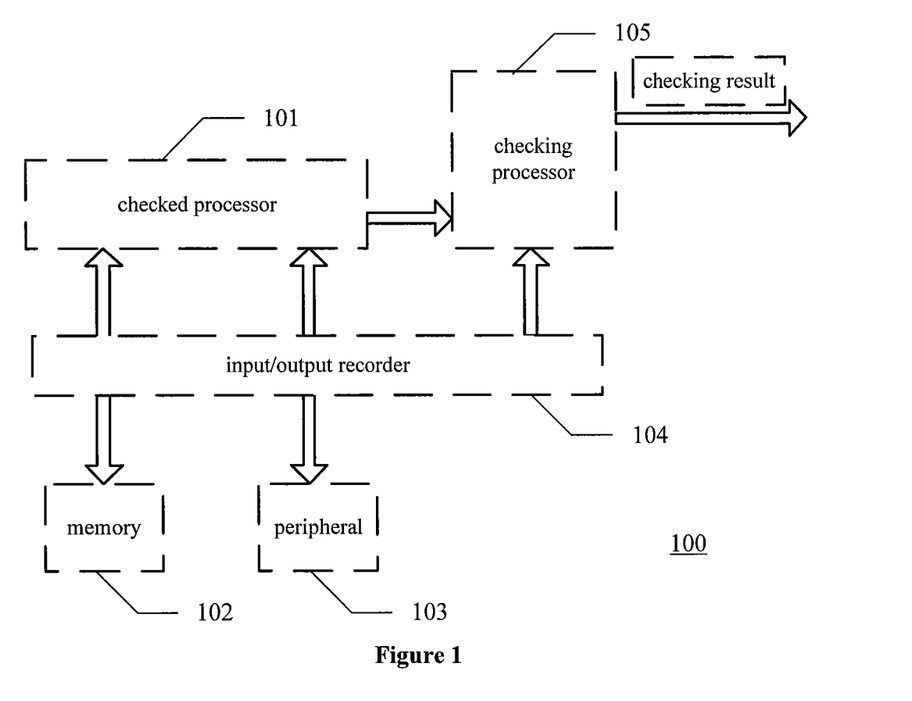
FIG. 1 schematically shows an exemplary system architecture 100 of a processor checking method, a checking device and a checking system according to an embodiment of the present disclosure.

FIG. 1 schematically shows an exemplary system architecture 100 of a processor checking method, a checking device and a checking system according to an embodiment of the present disclosure.

As shown in FIG. 1, the exemplary system architecture 100 includes a checked processor 101, a memory 102, a peripheral 103, an input and output recorder 104, and a checking processor 105. The checked processor 101 interacts with the memory 102 and/or the peripheral 103 during a running process. The input and output recorder 104 is disposed between the checked processor and the memory 102 and/or the peripheral 103, and may record interaction information between the checked processor 101 and the memory 102 and/or the peripheral 103 during the running process. During the running process, all access operations of the checked processor 101 pass through the input and output recorder 104 and are recorded by the input and output recorder 104. The input and output recorder 104 sequentially records the access operations of the checked processor 101 in the order of operation, forming an access sequence sorted in chronological order.

The access sequence may include read and write operations to the memory 102 by the checked processor 101, read and write operations to the peripheral 103 by the checked processor 101, and/or read and write operations initiated by the peripheral 103. The embodiment of the present disclosure may implement security checking on the checked processor 101 based on the above system architecture 100. It should be understood that the system architecture 100 is only an example of an application scenario of the embodiment of the present disclosure, and the embodiment of the present disclosure is not limited thereto. For example, the embodiment of the present disclosure may not use the hardware device of input and output recorder 104 to record the accesses to the memory by the checked processor 101 during the running process, but implement this function by means of software or a combination of software and hardware.

Figure 2:
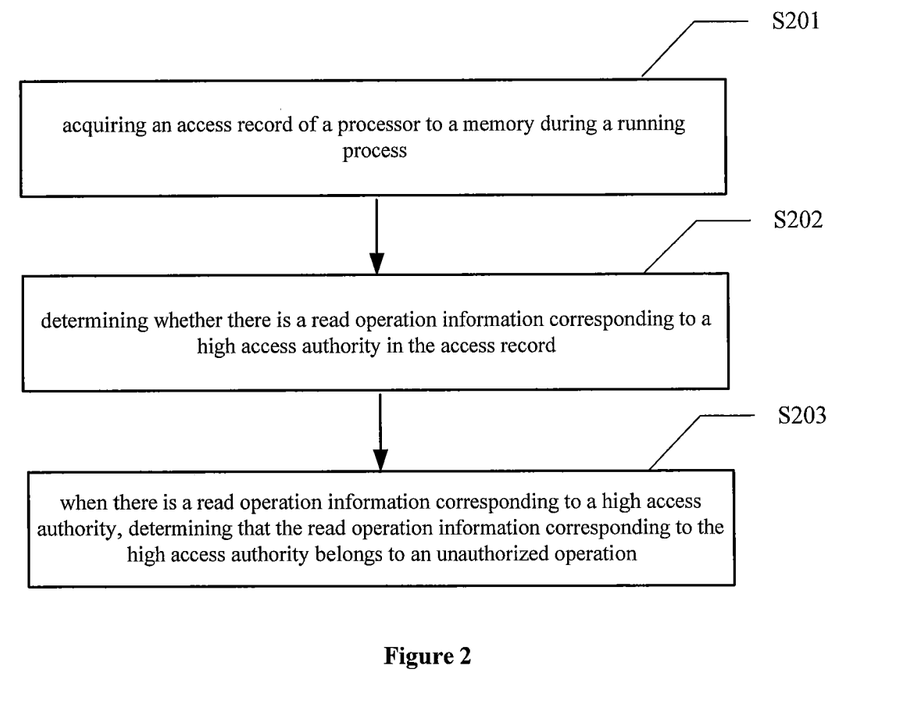
FIG. 2 schematically shows a flow chart of a processor checking method according to an embodiment of the present disclosure.

The process of performing security checking on the checked processor 101 using an access record stored in the input and output recorder 104 in the embodiment of the present disclosure will be described in detail below with reference to FIG. 2. FIG. 2 schematically illustrates a flow chart of a processor checking method according to an embodiment of the disclosure. This checking method may be performed by the checking processor 105. As shown in FIG. 2, the checking method includes operations S201, S202, and S203.

In operation S201, an access record to a memory (for example, the memory 102) by a processor (for example, the checked processor 101) during a running process is acquired, the access record includes a read operation information and a corresponding time information. In the application scenario of FIG. 1, the access record required to check the processor in the embodiment of the present disclosure may be read from the input and output recorder 104. The corresponding time information indicates the time when the read operation occurs.

It should be understood that the present disclosure does not limit the frequency of acquiring the access record. For example, the access record recorded in the input and output recorder 104 may be read in real time. As another example, a time interval may be set in advance, and the access record recorded by the input and output recorder 104 during the time interval is read at the time interval. The length of the time interval may be set according to the real-time requirement of the checking.

In operation S202, it is determined that there is a read operation information corresponding to a high access authority in the access record. For example, the checking processor 105 may traverse each read operation information in the access record one by one to determine whether there is a read operation information corresponding to a high access authority (that is, a read operation information corresponding to a read operation that occurs only under a high access authority according to the setting of the processor) in the access record. When there is a read operation information corresponding to a high access authority, the operation proceeds to S203. Otherwise, it may be determined that the read operation information in the access record is legal, and the checking analysis of the access record is terminated.

In operation S203, when there is a read operation information corresponding to a high access authority, it is determined that the read operation information corresponding to the high access authority belongs to an unauthorized operation. That is, it is checked whether the read operation corresponding to the read operation information is an authorized processor behavior. When it belongs to an unauthorized operation, a security alert may be sent to the user, otherwise the read operation may be deemed legal and the checking analysis of the read operation is terminated.

Alternatively, in an embodiment, when it is determined that the read operation information corresponding to the high access authority belongs to an unauthorized operation, the information corresponding to the unauthorized operation is saved, and a security alert is sent to the user, so that the user takes corresponding control measures according to the needs of the user, such as cutting off data transfer or turning off the processor.

According to the technical solution of the embodiment of the present disclosure, the behavior of the processor reading data from the memory is checked and analyzed, thereby preventing the security problems caused by malicious use of unauthorized reading operation. The checking solution of the embodiment of the present disclosure is capable of preventing cross-authority data leakage problems without affecting the high-efficiency running performance of the processor, and greatly improving processor security.

The beneficial effects of the checking method of the embodiment of the present disclosure when the checked processor 101 encounters "Meltdown" and "Spectre" attacks are described in detail below. Suppose an attacker writes a malicious program and runs it on the checked processor 101. During the running process, the malicious program will repeatedly call the CPU instruction to clear the cache, and use the branch prediction mechanism to prefetch some confidential data in the memory and write it into the cache. Since the security check such as authority check is not effectively performed under the branch prediction mechanism, the confidential data will be smoothly read from the memory to the cache at this time. According to the technical solution of the embodiment of the present disclosure, the operation of the checked processor reading the confidential data from the memory will be recorded in the access record. In this way, when checking and analyzing the access record, the checking device may discover the unauthorized operation through the authority check, and then issue a security alert in time so as to take timely security measures to prevent side channel attacks, thereby greatly improving the processor security.

Figure 3:
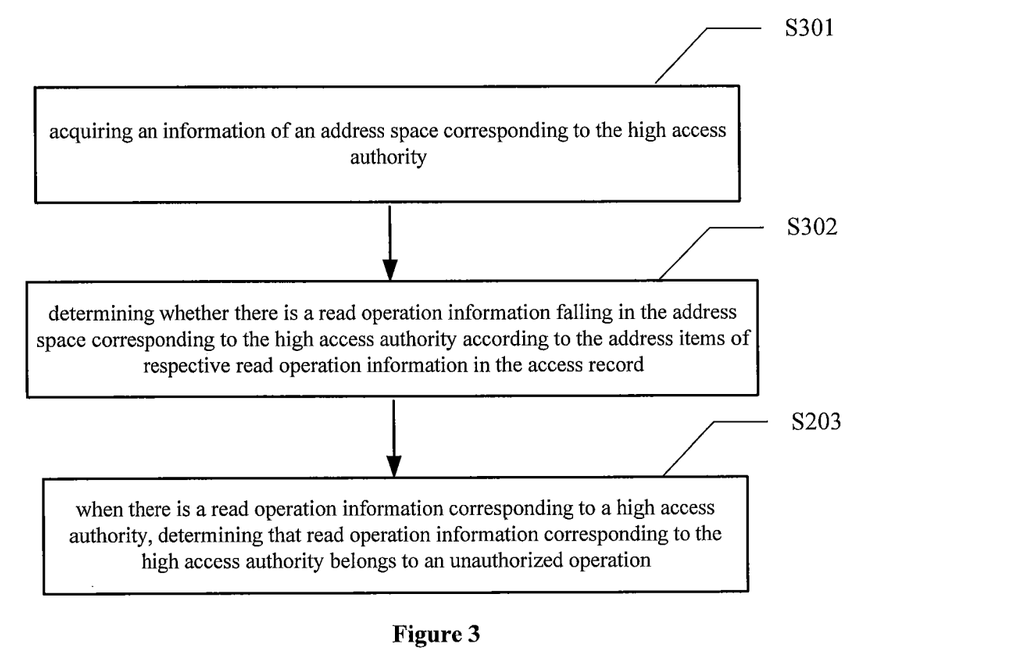
FIG. 3 schematically shows a flow chart of a processor checking method according to another embodiment of the present disclosure.

FIG. 3 schematically shows a flow chart of a processor checking method according to another embodiment of the present disclosure. This method may be performed by the checking processor 105.

As shown in FIG. 3, the method includes operations S301, S302, and S203. Operation S301 and operation S302 are one of specific embodiments of operation S202.

After acquiring the access record of the checked processor 101, in operation S301, an information of an address space corresponding to the high access authority is acquired. Then, in operation S302, it is determined whether there is a read operation information falling in the address space corresponding to the high access authority according to the address items of respective read operation information in the access record.

For example, in an application scenario in which the checked processor 101 uses a paging storage management system, the checking processor 105 may analyze the address space of the active page table in the checked processor 101 and the access authority in advance to generate an address space list corresponding to the high access authority. Moreover, when the active page table in the checked processor 101 changes, the address space list is updated and maintained accordingly. Thus, in operation S301, the address space list may be read to acquire the information of the address space corresponding to the current high access authority. Then, in operation S302, the address items of respective read operation information in the access record are traversed one by one to check whether there is a read operation information in which the access address falls in the address space corresponding to the high access authority.

If there is a read operation information in which the access address falls in the address space corresponding to the high access authority, the read operation information corresponding to the high access authority exists in the access record, and such operation information needs to be checked and analyzed in operation S203 to determine whether it belongs to unauthorized operation. Otherwise, the read operation information corresponding to the high access authority does not exist in the access record, and the checking and analysis of the access record may be terminated.

According to the technical solution of the embodiment of the present disclosure, it is possible to check and analyze only the read operation information corresponding to the high access authority in a targeted manner, thereby improving the efficiency of the security checking.

Figure 4:
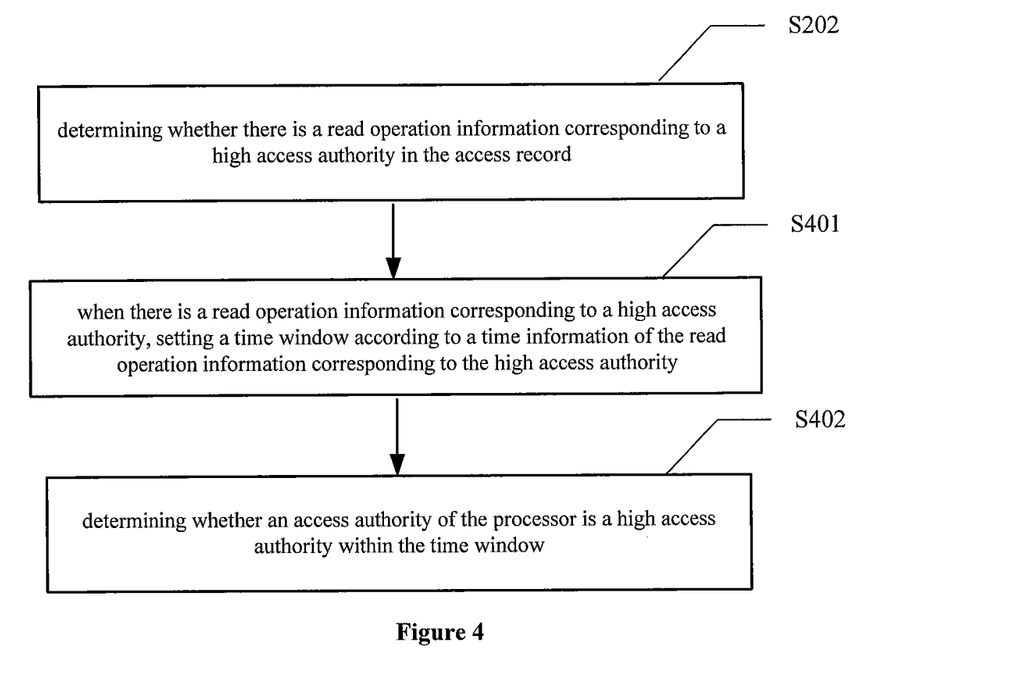
FIG. 4 schematically shows a flow chart of a processor checking method according to another embodiment of the present disclosure.

FIG. 4 schematically shows a flow chart of a processor checking method according to another embodiment of the present disclosure. This method may be performed by the checking processor 105.

As shown in FIG. 4, the method includes operations S202, S401, and S402. Operation S401 and operation S402 are one of specific embodiments of operation S203.

In operation S202, it is determined whether there is a read operation information corresponding to a high access authority. When there is a read operation information corresponding to a high access authority, in operation S401, a time window is set according to a time information of the read operation information corresponding to the high access authority. Then, in operation S402, it is determined whether an access authority of the processor is a high access authority within the time window.

The length of the time window is not limited in the embodiment of the present disclosure. For example, the length of the time window may be set according to a statistical result or an empirical value. Alternatively, in an embodiment, the length of the time window is greater than a sum of a prefetch time difference and a time overhead of reading data from the memory. The prefetch time difference refers to the time difference between the time when the processor reads the data in advance while using the branch prediction mechanism or the out-of-order execution mechanism, and the time when the processor reads the data while the branch prediction mechanism and the out-of-order execution mechanism are not used.

Generally, the smaller the length of the time window, the higher the security standard of the checking, and the more frequent the security alerting. On the other hand, the larger the length of the time window, the lower the security standard of the checking, and the higher the probability of occurrence of the security risk.

For example, the time of occurrence of the read operation information corresponding to the high access authority (that is, the time indicated by the corresponding time information) is used as the end point of the time window, and the time window is set forward for a predefined length of time. Then, it is checked whether the access authority of the processor is a high access authority during the time period corresponding to the time window.

Alternatively, in an embodiment, in operation S402, when determining whether the access authority of the processor is a high access authority within the time window, it may be determined whether there is a record of the high access authority in an access authority record of the processor. For example, the change history of the processor access authority during the running process may be recorded in advance, forming an access authority list corresponding to each time period in the running process. When determining whether the access authority of the processor is a high access authority within the time window, it may be determined whether there is an entry of a high access authority in the access authority list within the time period corresponding to the time window. If there is an entry of a high access authority, it is determined that the access authority of the processor is the high access authority, otherwise it is determined that the access authority of the processor is not the high access authority.

Alternatively, in an embodiment, when the processor is a multi-core processor, the access record further includes an identifier of a processor core to which a read operation information belongs. For example, when the input and output recorder 104 records the access record of the checked processor 101, the identifier of the processor core to which the access record belongs may be added during the recording process. In this way, when performing security checking on the checked processor 101, it may be performed separately for each processor core. For example, in the above operation S203, it is determined whether a belongs to an unauthorized operation according to the access authority of each processor core respectively. According to the embodiment of the present disclosure, the accuracy of the security checking and the security alerting may be improved.

Figure 5:
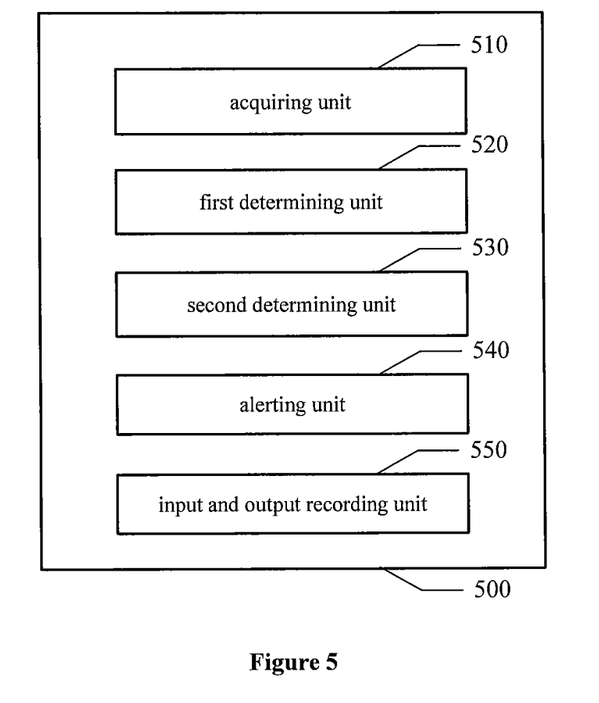
FIG. 5 schematically shows a block diagram of a processor checking device according to an embodiment of the present disclosure.

FIG. 5 schematically shows a block diagram of a processor checking device according to an embodiment of the present disclosure. As shown in FIG. 5, the checking device 500 includes an acquiring unit 510, a first determining unit 520, and a second determining unit 530. The checking device 500 is configured to perform the methods shown in FIGS. 2-4, and the same technical description is omitted in order to avoid redundancy.

The acquiring unit 510 is configured to acquire an access record to a memory by a processor during a running process, the access record includes read operation information and corresponding time information. The first determining unit 520 is configured to determine whether there is a read operation information corresponding to a high access authority in the access record. The second determining unit 530 is configured to: when there is a read operation information corresponding to a high access authority, determine whether the read operation information corresponding to the high access authority belongs to an unauthorized operation.

According to the checking device 500 of the embodiment of the present disclosure, the behavior of the processor reading data from the memory is checked and analyzed, thereby preventing the security problems caused by malicious use of unauthorized reading operation. In the checking solution of the embodiment of the present disclosure, the security of the processor may be guaranteed under the premise of allowing the processor to use the branch prediction mechanism and the out-of-order execution mechanism.

Alternatively, in an embodiment, the first determining unit 520 is specifically configured to: acquire an information of an address space corresponding to the high access authority; and then determine whether there is a read operation information falling in the address space corresponding to the high access authority according to the address items of respective read operation information in the access record.

Alternatively, in an embodiment, the second determining unit 530 is specifically configured to: set a time window according to a time information of the read operation information corresponding to the high access authority; and determine whether an access authority of the processor is a high access authority within the time window. Specifically, when determining that the access authority of the processor is a high access authority, the second determining unit may be configured to determine whether there is a record of the high access authority in an access authority record of the processor within the time window.

Alternatively, in an embodiment, the length of the time window is greater than a sum of a prefetch time difference and a time overhead of reading data from the memory.

Alternatively, in an embodiment, when the processor is a multi-core processor, the access record further includes an identifier of a processor core to which a read operation information belongs.

Alternatively, in an embodiment, the checking device 500 further includes an alerting unit 540. The alerting unit 540 is configured to save information corresponding to the unauthorized operation and send a security alert to user.

Alternatively, in an embodiment, the checking device 500 further includes an input and output recording unit 550. The input and output recording unit 550 is disposed between the processor and the memory, and is configured to record access operations of the processor to the memory during the running process. In this case, the acquiring unit 510 may read the access record from the input and output recording unit 550.

It can be understood that the acquiring unit 510, the first determining unit 520, the second determining unit 530, the alerting unit 540 and the input and output recording unit 550 may be combined and implemented into one module, or any one of the modules may be split into multiple modules. Alternatively, at least some of the functionality of one or more of these modules may be combined with at least some of the functionality of the other modules and implemented in one module. According to an embodiment of the present disclosure, at least one of the acquiring unit 510, the first determining unit 520, the second determining unit 530, the alerting unit 540 and the input and output recording unit 550 may be at least partially implemented as a hardware circuit such as a field programmable gate array (FPGA), Programmable logic array (PLA), system-on-chip, system on substrate, system on package, application specific integrated circuit (ASIC), or may be implemented in any other reasonable manner of hardware or firmware that integrates or packages the circuits, or may be implemented by software, hardware, firmware, or a combination thereof.

Alternatively, at least one of the acquiring unit 510, the first determining unit 520, the second determining unit 530, the alerting unit 540 and the input and output recording unit 550 may be at least partially implemented as a computer program module that may perform the function of a corresponding module when the program is run by a computer.

Figure 6:
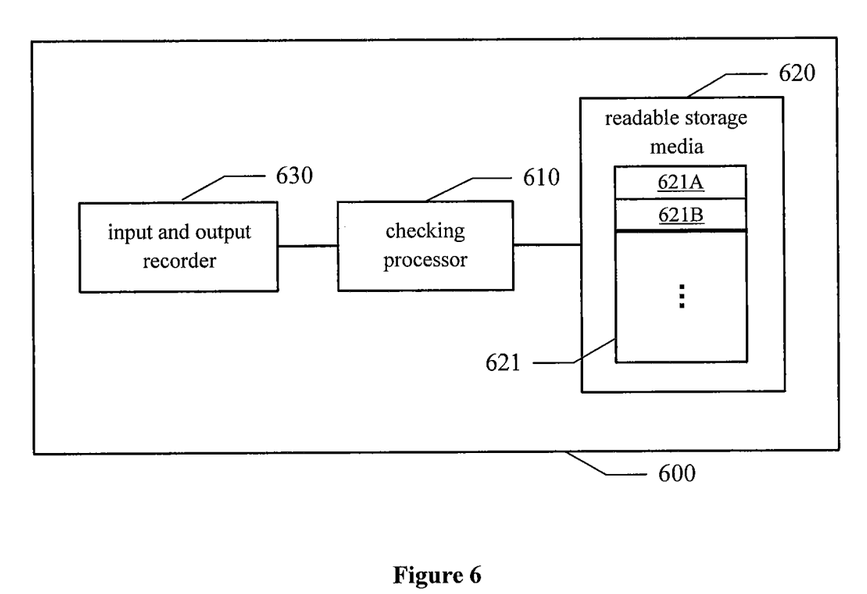
FIG. 6 schematically shows a block diagram of a processor checking system 600 according to another embodiment of the present disclosure.

FIG. 6 schematically shows a block diagram of a processor checking system 600 according to another embodiment of the present disclosure. As shown in FIG. 6, the checking system 600 includes a checking processor 610, a computer-readable storage medium 620, and an input and output recorder 630. The checking processor 610 is one of the specific embodiments of the checking processor 105, and the input and output recorder 630 is one of the specific embodiments of the input and output recorder 105. The checking system 600 may perform the method described above with reference to FIGS. 2-4 to check the checked processor 101.

Specifically, the checking processor 610 may include, for example, general purpose microprocessors, instruction set processors and/or associated chipsets and/or reconfigurable processors and/or special purpose microprocessors (for example, application specific integrated circuits (ASICs)), and the like. The checking processor 610 may also include an on-board memory for cache usage. The checking processor 610 may be a single processing unit or a plurality of processing units for performing different actions of the method flow according to the embodiments of the present disclosure described with reference to FIGS. 2-4.

The computer-readable storage medium 620 may be any medium that may contain, store, communicate, propagate, or transport instructions. For example, readable storage medium may include but are not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Computer-readable storage media 620 may include a computer program 621 that may include code/computer-executable instructions that, when being executed by the checking processor 610, cause the checking processor 610 to perform, for example, the method flow described above in connection with FIGS. 2-4 and any variations thereof.

Computer program 621 may be configured with computer program codes, including, for example, computer program modules. For example, in an example embodiment, the codes in the computer program 621 may include one or more program modules including, for example, a module 621A, a module 621B, etc. It should be noted that the division manner and the number of modules are not fixed, and those skilled in the art may use appropriate program modules or combination of program modules according to actual situations. When these program module combinations are executed by the checking processor 610, the checking processor 610 may perform the method flow described above in connection with FIGS. 2-10 and any variations thereof.

According to the embodiment of the present disclosure, the input and output recorder 630 is configured to record input and output information of the checked processor 101 during the running process. The checking processor 610 may interact with the input and output recorder 630 to execute the method flow described above with reference to FIGS. 2-4 and any variations thereof.

According to the embodiment of the present disclosure, at least one of the acquiring unit 510, the first determining unit 520, the second determining unit 530, the alerting unit 540 and the input and output recording unit 550 may be implemented as a computer program module described with reference to FIG. 6, which when being executed by the checking processor 610 may implement the respective operations described above.

The above-described methods, devices, units and/or modules according to various embodiments of the present disclosure may be implemented by a computing-capable electronic device that executes software containing computer instructions. The system may include a storage device to implement the various types of storage described above. The computing-capable electronic device may include, but is not limited to, a device capable of executing computer instructions, such as a general purpose processor, a digital signal processor, a special purpose processor, a reconfigurable processor, and the like. Execution of such instructions causes the electronic device to be configured to perform the above-described operations according to the present disclosure. The foregoing devices and/or modules may be implemented in one electronic device or in different electronic devices. The software may be stored in a computer-readable storage medium. The computer-readable storage medium stores one or more programs (software modules) that include instructions that, when being executed by one or more processors in an electronic device, cause the electronic device to perform the method of the present disclosure.

These software may be stored in the form of volatile or non-volatile storage (such as storage devices like ROM), whether erasable or rewritable, or stored in the form of memory (for example, RAM, memory chip, device, or integrated circuit), or stored on an optically readable medium or a magnetically readable medium such as a CD, a DVD, a magnetic disk, a magnetic tape, or the like. It is to be appreciated that storage devices and storage medium are examples of machine-readable storage devices suitable for storing one or more programs that include instructions that, when being executed, implement the present disclosure. Embodiments provide programs and a machine-readable storage device storing such programs, the programs including code for implementing the device or method according to any one of the claims of the present disclosure. In addition, these programs may be delivered electronically via any medium, such as communication signals carried over a wired connection or a wireless connection. Various embodiments suitably include these programs.

A person skilled in the art may understand that, the features described in the various embodiments and/or claims of the present disclosure may be combined or conjunct in various ways even if such combinations or conjunctions are not explicitly described in the present disclosure. In particular, various combinations and/or conjunctions of the features described in the various embodiments and/or claims of the present disclosure may be made without departing from the spirit and scope of the present disclosure. All such combinations and/or conjunctions are within the scope of this disclosure.

Although the present disclosure has been shown and described with reference to specific exemplary embodiments thereof, it will be understood by those skilled in the art that various changes in form and detail may be made without departing from the spirit and scope of the disclosure, as defined by the appended claims and their equivalents. Therefore, the scope of the disclosure should not be limited to the above-described embodiments, but should be determined not only by the appended claims but also by equivalents of the appended claims.

What is claimed is:

1. A processor checking method, comprising:
   acquiring an access record of a processor to a memory during a running process, wherein the access record comprises] at least one read operation information and corresponding time information;
   acquiring an information of an address space corresponding to a high access authority;
   determining whether there is a first read operation information falling in the address space corresponding to the high access authority according to address items of respective read operation information in the access record; and
   when there is the first read operation information corresponding to the high access authority, determining whether the first read operation information corresponding to the high access authority belongs to an unauthorized operation.

2. The method according to claim 1, wherein, determining whether the first read operation information corresponding to the high access authority belongs to the unauthorized operation comprises:
   setting a time window according to a time information of the first read operation information corresponding to the high access authority; and
   determining whether an access authority of the processor is a high access authority within the time window.

3. The method according to claim 2, wherein, determining whether the access authority of the processor is the high access authority within the time window comprises:
   determining whether there is a record of the high access authority in an access authority record of the processor within the time window.

4. The method according to claim 2, wherein, a length of the time window is greater than a sum of a prefetch time difference and a time overhead of reading data from the memory.

5. The method according to claim 1,
wherein, when the processor comprises a multi-core processor, the access record further comprises an identifier of a processor core to which the at least one read operation information belongs.

6. The method according to claim 1, wherein, when determining that the first read operation information corresponding to the high access authority belongs to the unauthorized operation, the method further comprises:
saving an information corresponding to the unauthorized operation and sending a security alert to a user.

7. The method according to claim 1, wherein, the method further comprises:
utilizing an input and output recorder to record access operations of the processor to the memory during the running process, wherein the input and output recorder is between the processor and the memory,
wherein the acquiring an access record of the processor to the memory during the running process comprises reading the access record from the input and output recorder.

8. A processor checking device, comprising:
one or more checking processors; and
a memory, configured to store one or more programs,
wherein the one or more programs, when executed by the one or more checking processors, cause the one or more checking processors to perform processor checking operations comprising:
acquiring an access record of a processor to a memory during a running process, wherein the access record comprises at least one read operation information and corresponding time information;
acquiring an information of an address space corresponding to a high access authority;
determining whether there is a first read operation information falling in the address space corresponding to the high access authority according to address items of respective read operation information in the access record; and
determining whether the first read operation information corresponding to the high access authority belongs to an unauthorized operation, when there is the first read operation information corresponding to the high access authority.

9. The checking device according to claim 8, wherein, the one or more programs, when executed by the one or more checking processors, further cause the one or more checking processors to perform processor checking operations comprising:
setting a time window according to a time information of the first read operation information corresponding to the high access authority; and
determining whether an access authority of the processor is a high access authority within the time window.

10. The checking device according to claim 9, wherein, the one or more programs, when executed by the one or more checking processors, further cause the one or more checking processors to perform processor checking operations comprising: determining whether there is a record of the high access authority in an access authority record of the processor within the time window.

11. The checking device according to claim 9, wherein, a length of the time window is greater than a sum of a prefetch time difference and a time overhead of reading data from the memory.

12. The checking device according to claim 8, wherein, when the processor comprises a multi-core processor, the access record further comprises an identifier of a processor core to which the at least one read operation information belongs.

13. The checking device according to claim 8, the one or more programs, when executed by the one or more checking processors, further cause the one or more checking processors to perform processor checking operations comprising:
saving an information corresponding to the unauthorized operation and sending a security alert to user.

14. The checking device according to claim 8, the one or more programs, when executed by the one or more checking processors, further cause the one or more checking processors to perform processor checking operations comprising:
utilizing an input and output recorder to record access operations of the processor to the memory during the running process, wherein the input and output recorder is between the processor and the memory; and
wherein the acquiring an access record of the processor to the memory during the running process comprises reading the access record from the input and output recorder.

15. A non-transitory computer-readable storage medium storing instructions capable of executing processor checking operations comprising:
acquiring an access record of a processor to a memory during a running process, wherein the access record comprises at least one read operation information and corresponding time information;
acquiring an information of an address space corresponding to a high access authority;
determining whether there is a first read operation information falling in the address space corresponding to the high access authority according to address items of respective read operation information in the access record; and
when there is the first read operation information corresponding to the high access authority, determining whether the first read operation information corresponding to the high access authority belongs to an unauthorized operation.

* * * * *